United States Patent [19]

Gadkaree

[11] Patent Number: 5,397,750
[45] Date of Patent: Mar. 14, 1995

[54] FABRICATING AN ALUMINUM ARTICLE

[75] Inventor: Kishor P. Gadkaree, Big Flats, N.Y.

[73] Assignee: Corning Incorporated, Corning, N.Y.

[21] Appl. No.: 235,453

[22] Filed: Apr. 29, 1994

Related U.S. Application Data

[63] Continuation of Ser. No. 158,410, Nov. 29, 1993, abandoned.

[51] Int. Cl.$^6$ ............................. C03C 10/06; C03C 14/00
[52] U.S. Cl. ................................................. 501/8; 501/32; 501/70; 501/73
[58] Field of Search .................... 501/8, 32, 70, 73

[56] References Cited

U.S. PATENT DOCUMENTS 4,615,987 10/1986 Chyung et al. .
4,626,515 12/1986 Chyung et al. .
4,755,489 7/1988 Chyung et al. .
4,769,346 9/1988 Gadkaree et al. .
4,846,866 7/1989 Chyung et al. .

*Primary Examiner*—Karl Group
*Attorney, Agent, or Firm*—Milton M. Peterson; Clinton S. Janes, Jr.

[57] ABSTRACT

An aluminum article having a mirror-like surface and an improved working tool and method for fabricating the article from an aluminum blank, the tool comprising a mechanically strong, abrasion-resistant body against which the aluminum blank is forced under pressure, the tool body comprising a whisker-reinforced, crystalline body consisting essentially of about 5–35 weight % of SiC whiskers and 65–95 weight % of a crystalline matrix. The predominant crystal phase in the crystalline matrix may be a $CaO-Al_2O_3-SiO_2$ crystal phase.

5 Claims, 1 Drawing Sheet

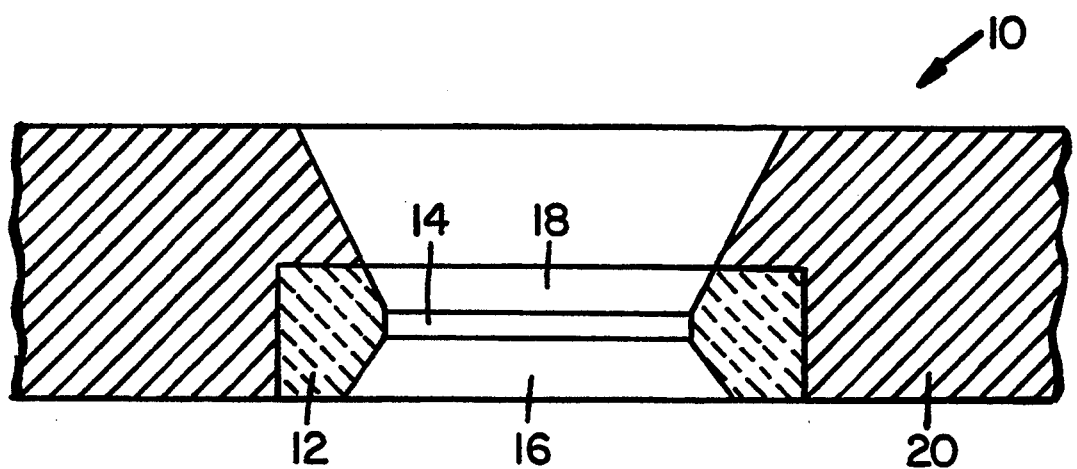

FABRICATING AN ALUMINUM ARTICLE

This is a continuation of application Ser. No. 08/158,410, filed Nov. 29, 1993, now abandoned.

FIELD OF THE INVENTION

Aluminum article, working tool and method for fabricating the article from an aluminum blank.

BACKGROUND OF THE INVENTION

Molten aluminum is cast or rolled into blank bodies such as slabs, sheets and tubular lengths. These are commonly referred to as ingots or billets. The blanks are then reworked to convert them into useful forms. The resulting products include such diverse items as food and beverage containers, electrical wire, and automotive parts.

The reworking operation, in general, involves compressing an aluminum blank against a mechanically strong, abrasion-resistant surface. This surface may be the interior of an extrusion die in the case of aluminum beverage cans. Aluminum wire is produced by drawing a cylindrical blank through a wire die. Aluminum sheet or foil results from drawing blank sheet through rollers.

Various ceramic materials, including $Al_2O_3$, $Si_3N_4$, SiC and WC, have heretofore been considered for use in aluminum reworking operations. Alumina, reinforced with SiC whiskers, has also been proposed. However, it proved to be unsatisfactory because of a problem with porosity. Tungsten carbide (WC) is currently used in commercial extrusion dies.

While the various ceramic materials are effective for the reworking purpose, they all leave room for improvement. In particular, they tend to produce a rough or matte surface on a reworked aluminum article. Also, some of the materials tend to wear relatively rapidly, thereby requiring frequent replacement.

It is then a basic purpose of the present invention to provide an improved material for use in fabricating articles from aluminum blanks. A further purpose is to provide a fabricated aluminum article with an improved surface finish.

SUMMARY OF THE INVENTION

One aspect of the invention resides in an improved working tool for fabricating an article from an aluminum blank, the tool comprising a mechanically strong, abrasion-resistant body having a surface against which the aluminum blank is forced under pressure, and the improvement being a tool comprising a whisker-reinforced, crystalline body consisting essentially of about 5-35 weight % of SiC whiskers and 65-95 weight % of a crystalline matrix, that is essentially non-reactive with the aluminum whereby the fabricated aluminum article has an improved surface finish. The predominant crystal phase in the crystalline matrix may be a $CaO—Al_2O_3—SiO_2$ crystal phase.

The invention further resides in a method of fabricating an aluminum article from an aluminum blank which comprises forcing the aluminum blank under pressure against the surface of a mechanically strong, abrasion-resistant reworking tool, the tool being a whisker-reinforced, crystalline body consisting essentially of about 5-35 weight % of SiC whiskers and 65-95 weight % of a crystalline matrix that is essentially non-reactive with the aluminum whereby the fabricated aluminum article has an improved surface finish. The predominant crystal phase in the crystalline matrix may be a $CaO—Al_2O_3—SiO_2$ crystal phase.

BRIEF DESCRIPTION OF THE DRAWING

The single FIGURE in the accompanying drawing is a partial side view in cross-section of a working tool in accordance with the invention.

DESCRIPTION OF THE INVENTION

It is well recognized in the ceramic art that both glass and glass-ceramic materials can be reinforced by the inclusion of whiskers or fibers in the body of the ceramic material. For example, U.S. Pat. Nos. 4,626,515 and 4,846,866 (Chyung et al.) disclose reinforced alkaline earth aluminosilicate glasses. U.S. Pat. Nos. 4,615,987 and 4,755,489 (Chyung et al.) disclose reinforced alkaline earth aluminosilicate glass-ceramics.

In connection with development of the reinforced ceramic materials, it was learned that a whisker-reinforced, cordierite, crystallized ceramic had particular utility in the extrusion of ferrous and non-ferrous alloys, in particular, copper alloys. The use of a whisker-reinforced, cordierite ceramic body in an extrusion die is disclosed in U.S. Pat. No. 4,769,346 (Gadkaree et al.). The extrusion is carried out at temperatures on the order of 700° C.-900° C. The reinforced ceramic die exhibited excellent durability in the operation.

The term "whiskers" is commonly applied to elongated, single-crystal fibers. In general, whiskers are described as having a thickness less than about 100 microns with a length-to-diameter ratio of at least 5. In contrast, fibers are generally considered to be multi-crystalline or amorphous.

Both whiskers and fibers are effective to reinforce ceramics. However, the mechanism involved appears to be somewhat different. Thus, for purposes of metal extrusion, a fiber-reinforced body was found to be relatively ineffective. No confirmed explanation of this difference in behavior between whiskers and fibers is readily at hand. However, it is believed to be connected with the difference in orientation of the two crystalline forms in a matrix. Whiskers tend to be randomly oriented, whereas fibers are generally oriented in one direction. In any event, the use of a fiber-reinforced material was found to be relatively ineffective in the extrusion of copper alloys. That finding is also true in connection with the present invention.

The present invention arose from an inquiry as to whether the reinforced, cordierite glass-ceramics, disclosed in the -346 patent for copper extrusion, might also be useful for aluminum extrusion. Aluminum processing presents rather different requirements. The temperature is generally under 500° C., whereas copper extrusion is carried out at temperatures in the range of 700°-900° C. As a result, the need for good thermal shock resistance is much less for a material used in aluminum processing.

Accordingly, whisker-reinforced, $CaO—Al_2O_3—SiO_2$, crystalline materials were selected for trial. As reported in the Chyung et al. -489 patent, such reinforced glass-ceramics may consist essentially, in weight percent, of 16-20% CaO, 38.5-46% $Al_2O_3$, 35-42% $SiO_2$ and up to 10% of a nucleating agent such as $ZrO_2$. The latter materials have a coefficient of thermal expansion (CTE) on the order of $45 \times 10^{-7}/°$ C. This is in contrast to the $20 \times 10^{-7}/°$ C. CTE value for the cordierite materials disclosed for copper alloy extrusion.

It was found that the CaO—Al$_2$O$_3$—SiO$_2$ glass-ceramic performed extremely well as a die material in a test run in which aluminum beverage cans were extruded. Most importantly, the extruded aluminum cans had a mirror-bright finish. This was in decided contrast to the rough, or matte, type finish heretofore obtained with ceramic materials.

Again, the reason for this unexpected surface finish on the aluminum article is not definitely known. It is, of course, known that the SiC whiskers have a very high E-modulus. In contrast, the glass-ceramic matrix material is relatively soft with an E-modulus about a tenth of that of the present carbide material.

The difference in surface finish suggests that some chemical action normally occurs between the aluminum, the material of the die, and the lubricant supplied between the die and the aluminum blank during reworking. While this is speculative, it is apparent that no chemical interaction occurs between the present, whisker-reinforced glass-ceramic, the lubricant and the aluminum. Another possible explanation for the unusual surface effect derives from the low coefficient of friction between the aluminum surface and that of the die material of this invention. This, of course, would be a physical or mechanical effect.

The invention is further described with reference to a specific application, namely, extrusion of aluminum beverage cans. However, the applicability of the invention to other articles and processes will be readily understood by those familiar with the aluminum fabrication art.

A glass batch was mixed based on a formulation, calculated in parts by weight on an oxide basis, consisting of SiO$_2$ 39.5, Al$_2$O$_3$ 38.5, CaO 18.4, ZrO$_2$ 3.0, and As$_2$O$_3$ 0.5. The batch was dry ball-milled to provide homogeneity. It was then melted for 16 hours at 1650° C. in a platinum crucible. The melt was poured onto a steel plate to form a circular slab. The slab was annealed in an annealer operating in the range of 600°–750° C.

Silicon carbide (SiC) whiskers, obtained from a commercial source, were deagglomerated in known manner. The whiskers were added to a mixture of distilled water, isopropanol and an organic binder. The mixture was then blended for 5 minutes in a Waring blender to produce a uniform suspension. The whiskers had diameters of about one micron and lengths of 40–50 microns.

A portion of a glass slab was comminuted to particles having an average size less than 10 microns. The glass powder was then added to the deagglomerated whiskers in the blender, and the mixture blended for 5 minutes. The resulting suspension was filtered, and the filter cake dried. The filter cake was burned out by heating in air at 600° C. for two hours. This removed the organic binders. The filter cake was then placed in a mold and consolidated by heating at a temperature of 1500° C. for 30 minutes. The consolidation was conducted under a pressure of 10.4 KPa (1500 psi) in a nitrogen atmosphere.

The consolidated body was then subjected to a two-tier crystallizing procedure to crystallize the glass in situ. The body was first heated at 800°–900° C. for two hours followed by two hours at 1200° C. X-ray diffractometry showed triclinic anorthite, mullite and alpha-alumina crystal phases.

Modulus of rupture values of about 312.5 KPa (45,000 psi) were measured on the body at 25° C. by a standard four-point bend test.

The slab was then machined and mounted to produce a die assembly as shown in the accompanying drawing, a partial side view in cross-section of an extrusion tool for aluminum extrusion. The die assembly, generally designated by the numeral 10, comprises die 12. Die 12 is a machined insert having a double-flared inner surface with a narrow, annular wall 14 intermediate flared sections 16, 18. Die 12 is seated in a tool steel die holder 20 which provides a compressive interference fit and a physical support for die 12.

A die assembly was employed in a commercial apparatus for a test run of extruded aluminum cans. The run was continued for a production of 10,000 cans. Reportedly, the die was intact at the end of the run, can quality had not deteriorated during the run, and the cans had the unexpected, bright-mirror finish.

I claim:

1. In an improved working tool for fabricating an article from an aluminum blank, the tool comprising a mechanically strong, abrasion-resistant body having a surface against which the aluminum blank is forced under pressure, and the improvement being a tool comprising a whisker-reinforced, crystalline body consisting essentially of about 5-35 weight % of SiC whiskers and 65-95 weight % of a crystalline matrix comprising a predominant crystal phase of CaO—Al$_2$O$_3$—SiO$_2$ and is essentially non-reactive with the aluminum whereby the fabricated aluminum article has an improved surface finish.

2. An improved working tool in accordance with claim 1 wherein the predominant crystal phase in the crystalline matrix is anorthite.

3. An improved working tool in accordance with claim 1 wherein the tool is an extrusion die.

4. An improved working tool in accordance with claim 1 wherein the matrix of the whisker-reinforced, crystalline body has an oxide composition consisting essentially of, as calculated in weight % on an oxide basis, 16-20% CaO, 38.5-46% Al$_2$O$_3$, 35-42% SiO$_2$ and an effective amount of a nucleation agent not exceeding about 10%.

5. An improved working tool in accordance with claim 4 wherein the nucleating agent is ZrO$_2$.

* * * * *